April 21, 1931.  B. ALBY  1,801,652
TREATMENT OF SHORE LINES
Filed Nov. 17, 1926   2 Sheets-Sheet 1
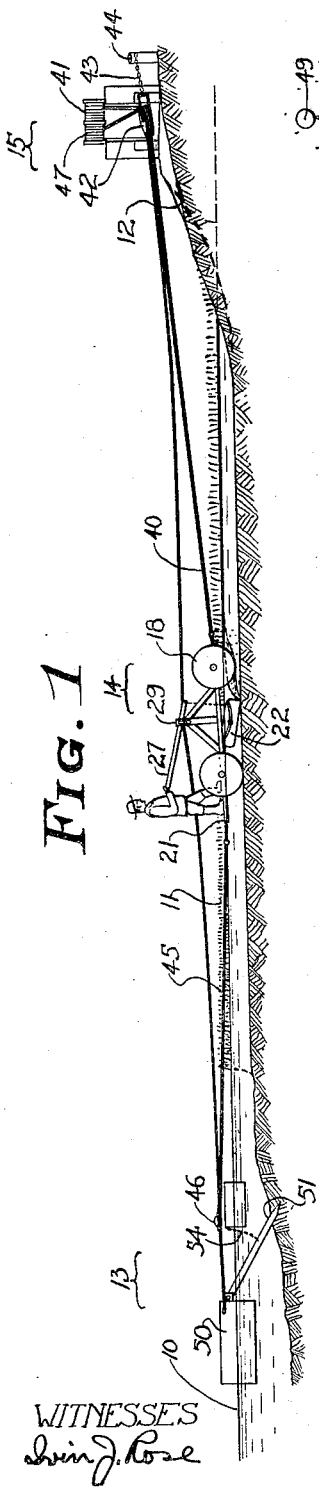
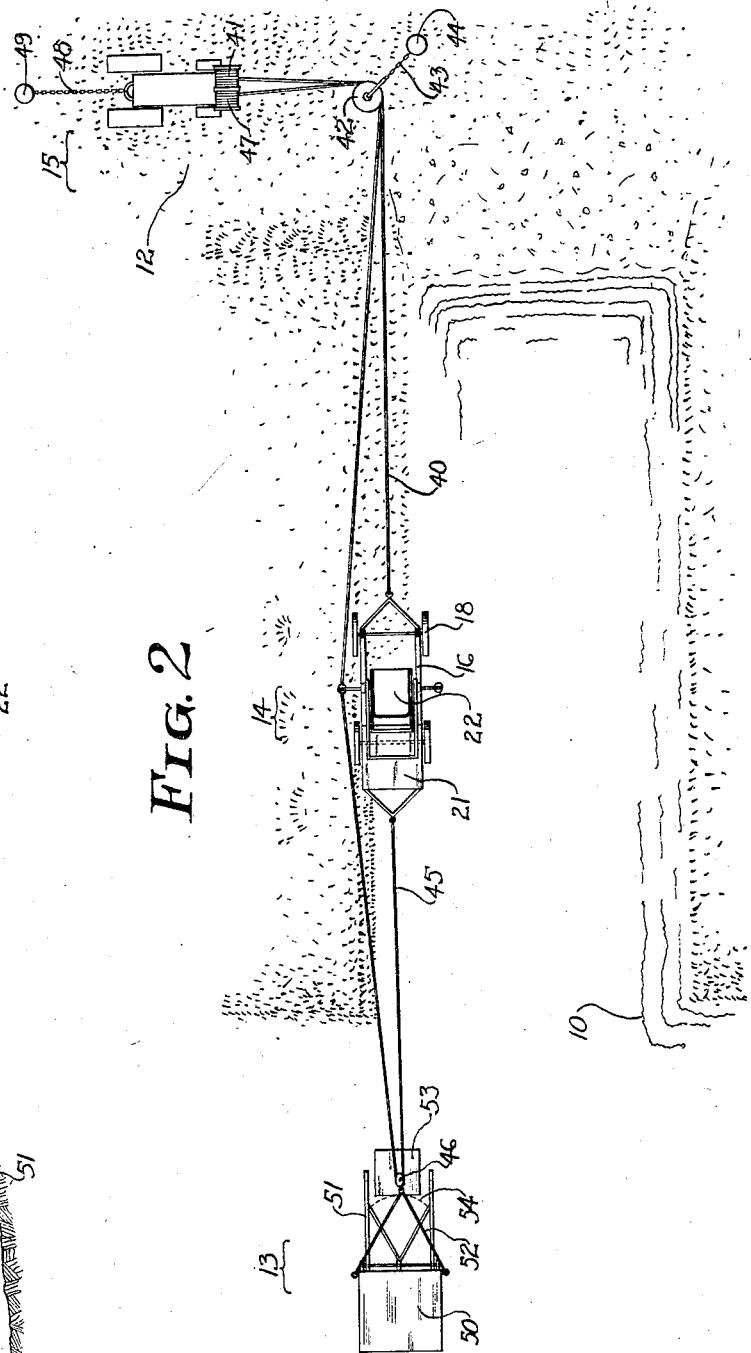
WITNESSES
Irving J. Rose
M. E. Downey
INVENTOR
Barney Alby
By R. H. Caldwell
ATTORNEY April 21, 1931.   B. ALBY   1,801,652
TREATMENT OF SHORE LINES
Filed Nov. 17, 1926   2 Sheets-Sheet 2

WITNESSES
Irving J. Rose.
M. E. Douriey

INVENTOR
Barney Alby
ATTORNEY

Patented Apr. 21, 1931

1,801,652

UNITED STATES PATENT OFFICE

BARNEY ALBY, OF WATERFORD, WISCONSIN

TREATMENT OF SHORE LINES

Application filed November 17, 1926. Serial No. 148,906.

The invention relates to the treatment of shore lines of lakes and rivers to enhance the value of the shore frontage for purposes of habitation and incidental use.

The shores of lakes and rivers are frequently bordered by boggy and weedy ground ranging up to several hundred feet in width and lying between the open water and the higher shore land. When this condition exists the adjacent shore land is not very desirable as habitable shore property, since access to the open water is difficult, the boggy stretch is a breeding place for insects, and the surroundings are unattractive.

The present invention contemplates the provision of means whereby boggy shore lines can be converted into attractive, clean-cut shore lines to thereby improve the appearance of the shore frontage and greatly enhance its value.

In the accompanying drawings, Fig. 1 is a schematic elevation showing the manner of treating a shore line in accordance with the invention;

Fig. 2 is a schematic plan view of the shore line undergoing treatment;

Figure 3:
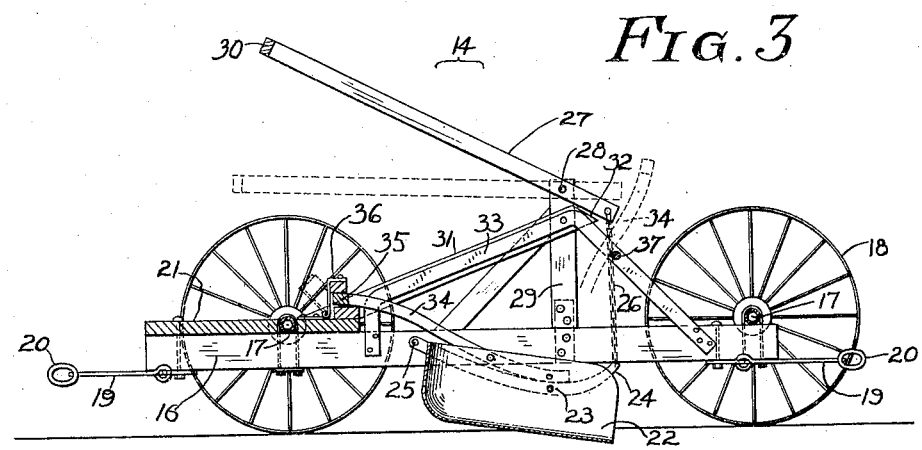
Fig. 3 is a longitudinal sectional view of a scraping device employed in carrying out the invention.

In these drawings, the numeral 10 designates a body of open water, such as a lake or river, bordered by a boggy stretch 11 which separates the open water from higher shore land 12. In carrying out the invention, the boggy stretch is cut or dredged away to extend the open water to the shore land 12, and this is accomplished in the present instance by grading down the boggy stretch and conveying the débris to the shore land, where it may form additional usable shore land. The apparatus employed for this purpose consists, in general, of an anchorage, preferably floating, adapted to be placed out in the open water beyond the bog, a scraping device 14 adapted to shuttle transversely of the bog between the open water and the higher shore land, and a traction device 15 preferably placed on the shore land 12 and having an operative connection with the scraper.

Figure 4:
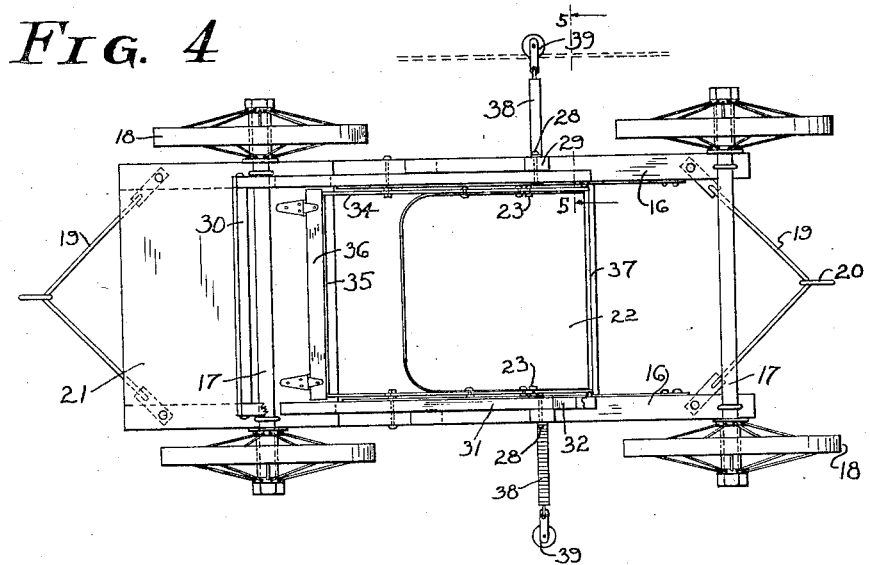
Fig. 4 is a top plan view of the device, parts being broken away.
Figure 5:
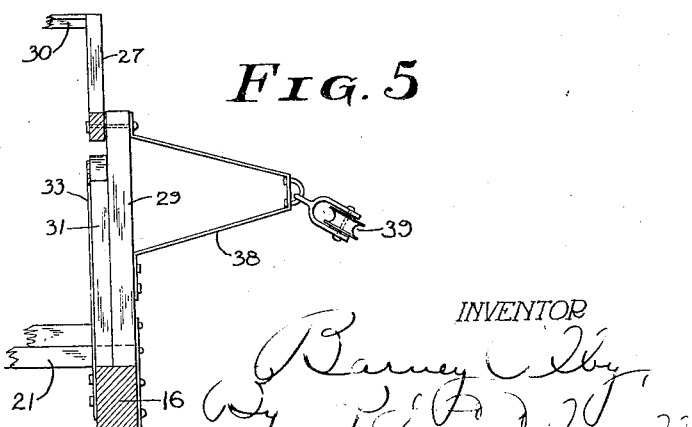
Fig. 5 is a fragmentary sectional view taken on the line 5—5 of Fig. 4.

The scraping device 14 is shown in detail in Figs. 3 to 5 and includes a frame formed of spaced longitudinally-extending stringers 16 connected transversely by a pair of spaced axles 17 each provided with wheels 18 at its ends. At each end of the frame including the stringers 16 is secured a draft bail 19 provided with a link 20 to receive the end of a draft cable, hereinafter described, and at the rear end of the frame is mounted an attendant's platform 21. A scraper pan 22 is disposed between the spaced stringers 16 and about midway between the wheeled axles 17, and has pivotal mountings 23 at opposite sides on the intermediate portions of suspension levers 24, the rear ends of which are pivotally mounted on the stringers 16 by means of bolts 25. The forward ends of the levers 24 are supported by suspension chains 26 having their upper ends carried by a handle frame 27 which is intermediately pivoted near its forward portion on bolts 28 each disposed in the upper end of a re-enforced upright 29 carried by each stringer 16. The longer end of the handle frame 27 projects rearwardly and is provided with a handle-forming cross-bar 30 placed in convenient reach of an attendant standing on the platform 21.

Each upright 29 is re-enforced by means of an inclined rearwardly extending structural member 31 which forms a stop 32 at its forward end limiting the downward movement of the forward portion of the handle frame 27, thereby determining the normal scraping position of the scraper pan 22. The suspension chains 26 which support the scraper pan from the handle frame 27 are adjustable in length to permit a variation in the scraping position of the scraper pan 22. In order to further re-enforce each upright 29, an angular re-enforcing bar 33 has its ends secured to the adjacent stringer 16 and one leg secured along the inclined structural member 31.

The scraper pan 22 has fixed thereto a rearwardly projecting handle 34 having a cross-bar 35 at its rear end normally resting against the platform 21 in which position it is retained by a hinged latch bar 36 capable of being moved by the foot into or out of latching position. When the latch bar 36 is released, the handle 34 of the scraper pan is free to swing forwardly to permit the tilting and discharge of the scraper pan in which movement the handle is limited by its abutment with a stop bar 37 connecting the forward legs of the re-enforcing bars 33. The suspension levers 24 on which the scraper pan is pivotally mounted are spaced laterally from the sides of the scraper pan in order to provide clearance for the handles 34 when the scraper pan is being tilted. The uprights 29 each have laterally projecting therefrom at the sides of the frame a bracket or outrigger 38, which carries a cable-supporting sheave or pulley-block 39 at its outer end.

In order to propel the wheeled scraper forward, a cable 40 is attached to the front draft bail 19 of the scraper frame and extends to the shore land 12 where it is secured to a winding drum 41 of the traction device 15 after passing around a sheave block 42 which is carried at the end of an adjustable chain 43 secured to a stump or post 44, or other convenient stationary object. Another cable 45 is secured to the rear draft bail 19 and projects rearwardly from the wheeled scraper to and about a sheave 46 at the floating anchorage 13, from which the cable extends forwardly past the wheeled scraper, being spaced therefrom and supported by passing through one of the outrigger sheaves 39. From this point the cable 45 extends forwardly around the sheave block 42 and thence to another winding drum 47 on the traction device, which latter may conveniently be a tractor equipped with a winch comprising the winding drums 41 and 47. The tractor is anchored by means of a chain 48 engaging a stump or post 49, or other convenient stationary object.

The floating anchorage 13 consists of a float 50 which carries stakes 51 pivotally mounted at their upper ends and pointed at their lower ends to embed themselves in the river or lake bottom, when the cable 45 is placed under tension. The sheave 46 which carries the cable 45 is mounted on a bridle or bail 52 secured to the float 50, and a second forward float 53 is provided to support the bridle and sheave when tension on the cable is relaxed. The stakes are equipped with chains 54 leading up to the float 53 so that the stakes may be readily released from the lake bottom when required. To assist in this operation the stakes are preferably slightly bouyant, so that they can be lifted with little effort.

In operation, the float assembly is towed into the open water opposite the point where the bog is to be removed and the stakes 51 are then let down by their chains 54 so that they will sink into the bed of the lake. The traction device is then set up on the shore land 12 and the sheave 42 is disposed in a suitable location approximately opposite the anchorage. After the cables are strung in place and attached to the wheeled scraper 14, as herebefore described, they are placed under tension by operating the winding drums 41 and 47, which causes the stakes 51 of the floating anchorage to embed themselves in the lake bottom. The winding drums are then manipulated to move the wheeled scraper frame out towards the floating anchorage. At this time, the scraper pan 22 is adjusted to its cutting position by means of the suspension chains 26 attached to the pan-supporting levers 24. The wheeled scraper is then drawn forwardly by winding the cable 40 on the winding drum 41, while the cable 45 is simultaneously permitted to uncoil from the winding drum 47. The forwardly moving scraper pan cuts the bog below the water level and the bog débris is thereupon deposited into the pan. The cutting thrust on the scraper pan is taken by the pan-supporting levers 24, and by reason of the location of the pivotal mountings of these levers on the frame, a downward component of thrust acts on the scraper pan to retain the pan in its proper cutting position. When the scraper pan is loaded, the operator lifts it by depressing the rear end of the handle frame 27, and the scraper frame is then drawn to the shore line, where the load is dumped after releasing the latch bar 36. The dumping operation may conveniently be effected by again dropping the scraper pan so that its forward edge catches the bottom to effect tilting of the pan, in which tilting movement it is limited by the engagement of the handle 34 with the stop bar 37. The wheeled frame is then retracted toward the floating anchorage to be reloaded in a similar manner, and the operation is repeated if necessary until the bog has all been cut away to the shore line, where the débris is dumped. After this first swath has been cut through the bog the floating anchorage 50 is moved laterally in position for cutting the next swath, and the sheave 42 on the shore land is moved correspondingly. The new swath is then cut as above described, and succeeding swaths are cut in the same manner after suitably changing the position of the floating anchorage 50 and the sheave 42, thereby extending the open water to the higher shore land 12. If the water which now occupies the space formerly containing the cut-away bog is to be made deeper, the cycle of operations is repeated by dredging the bottom in the same manner as cutting away the bog. The floating anchorage is capable of very simple and expeditious change of position, as required from time to time, and the sheave 42 on the shore land is also capable of convenient change in position so that it is unnecessary to make frequent changes in the position of the tractor 15.

The disposition of the débris conveyed to the shore land is determined by the character of the shore land. If the shore rises abruptly from the bog then the débris in many instances may be used to extend the shore line, while if the shore land is rather low near the bog, then the débris may be utilized to increase its elevation. In exposed localities, it may be desirable to build a sea wall at the shore line, but in many of the inland lakes and rivers this is not essential. The shore land may now be seeded to produce a lawn, which will usally flourish in fresh water localities because the bog débris is rich in organic matter. In places where the lake bottom is still soft after cutting away the bog, it may be given a dressing of gravel if conditions warrant, and in northern climates this is conveniently accomplished by spreading a layer of gravel on the ice in the winter time and permitting it to sink to the bottom as the ice melts away in the spring.

By means of the invention it is possible to convert boggy shore lines into attractive clean-cut shore lines, thereby improving the appearance of the shore line and enhancing the value of the shore frontage.

What I claim as new and desire to secure by Letters Patent is:

1. In a scraping device, the combination of a wheeled frame, a scraper pan pivotally mounted on said frame for tilting movement to a discharging position, a pivotally mounted handle above the frame, suspension means supporting said scraper pan from said handle and permitting the elevation of said pan by said handle, stop means determining the normal position of said scraper pan, a rearwardly projecting handle carried by said scraper pan, and latch means restraining the movement of said handle and capable of being released therefrom to permit tilting and discharging of said scraper pan.

2. In a scraping device, the combination of a wheeled frame, spaced levers pivotally mounted on said frame and projecting forwardly from their pivotal mountings, a scraper pan pivotally and tiltably mounted on said levers, a pivotally mounted handle above the frame, suspension means connecting said handle and levers and permitting the elevation of said pan by said handle, a rearwardly projecting handle carried by said scraper pan, and latch means restraining the movement of said handle and capable of being released therefrom to permit tilting and discharging of said scraper pan.

3. In a scraping device, the combination of a wheeled frame having a platform at its rear portion, a scraper pan pivotally mounted on said frame, a pivotally mounted handle above the frame having its rear end projecting to a region above said platform, suspension means supporting said scraper pan from the forward portion of said handle and permitting the elevation of said pan by said handle, a rearwardly projecting handle carried by said scraper pan and extending above said platform, and a pivotally mounted latch member above said platform restraining the movement of said handle and capable of being released therefrom to permit tilting and discharging of said scraper pan.

4. In a scraping device, the combination of a wheeled frame, spaced levers pivotally mounted on said frame and projecting forwardly from their pivotal mountings, traction means for said frame distinct from said levers, a scraper pan pivotally mounted on said levers for tilting movement to a discharging position, adjustable suspension means for varying the elevation of said scraper pan, a rearwardly projecting handle carried by said scraper pan, and latch means restraining the movement of said handle and releasable from said handle to permit tilting and discharging of said scraper pan.

In testimony whereof I affix my signature.

BARNEY ALBY.